Patented Aug. 2, 1938

2,125,300

UNITED STATES PATENT OFFICE 2,125,300

METHOD OF PREPARING SUBSTANTIALLY PURE FREE MAHOGANY SULPHONIC ACIDS

George Andreas Kessler and Leo Salzmann, Butler, Pa., assignors to L. Sonneborn Sons, Inc., a corporation of Delaware No Drawing. Application October 6, 1936, Serial No. 104,180

6 Claims. (Cl. 260—159)

This invention relates to a new and useful method of preparing substantially pure free mahogany sulphonic acids. The conventional refining treatment of certain lubricating oil distillates derived from petroleum includes the application of fuming sulphuric acid. This reacts with the oil, producing a black sludge containing unreacted sulphuric acid and certain types of sulphonic acids. Though the concentration of $SO_3$ in the fuming acid may vary considerably, a 20% fuming acid is employed in the majority of cases. As a result of the high degree of sulphonation obtained in the acid treatment, a considerable amount of sulphonic acids is produced. These are principally of two types, that is, the so-called water-soluble type predominantly contained in the sludge and the so-called oil-soluble type predominantly found in the oil to the extent of a few percent. The acid application is regulated in the manner well known in the art to produce the desired sulphonation reaction and in general temperatures not exceeding 140° F. are preferred. The acids contained in the sludge, while limitedly soluble, if at all, in hydrocarbon oils, are highly water soluble, imparting to their aqueous solution a dark-green color, and being for this reason generally referred to as "green petroleum sulphonic acids". The acids left in solution in the oil impart a reddish color to the oil and for this reason are generally referred to as "mahogany petroleum sulphonic acids". After the separation of the oil from the acid sludge the mahogany sulphonic acids are removed from the oil either directly as such in accordance with the method described in the Liberthson Patent 2,050,345 (Aug. 11, 1936), or by the ordinary refining method comprising conversion of the acids into salts by direct neutralization of the acid treated oil followed by suitable extraction. The acid salts or mahogany sulphonates constitute a valuable by-product of petroleum refining, being used after further purification, if necessary, for a variety of purposes, but primarily as emulsifying agent.

For certain purposes it is desirable to obtain the free mahogany sulphonic acids in a substantially pure state. So, for instance, where for special purposes it is desired to use free acids instead of the sodium salts, or to prepare esters and salts of various organic and inorganic bases. Hitherto it has not been possible to accomplish this result in any satisfactory manner as it is extremely difficult to obtain a product substantially free from sulphuric acid and salts.

We have discovered that these mahogany sulphonic acids can be obtained in a substantially pure condition by the action of gaseous hydrochloric acid upon a solution of mahogany sulphonates, substantially free from involatile inorganic acids, in a suitable water immiscible organic solvent. The solvent must be such as will not dissolve inorganic salts but will rather precipitate the same once they are formed within the solvent. We have found that suitable solvents of this nature are, for instance, petrol ether, gasoline, benzol and its homologues, chlorinated hydrocarbons, and others of a like character.

In accordance with the invention hydrochloric acid gas is passed through a substantially acid-free solution of mahogany sulphonate in a suitable organic solvent of the afore-described nature. A color change from orange to red will be observed together with salt precipitation. The metal component of the sulphonate, in most cases sodium, is replaced by the hydrogen of the hydrochloric acid, thus forming a metal chloride. The reaction is accompanied by considerable heat development. The solution, separated from undissolved inorganic matter by settling, filtration, centrifuging or the like, yields after the evaporation of the solvent the free sulphonic acids in the form of a dark reddish syrup. Inasmuch as dissolution of the mahogany sulphonate will precipitate ab initio any salt originally present in the sulphonate, a crude mahogany sulphonate may be used, and it is not necessary to free the same from any salt content that it may possess. It is requisite, however, that the sulphonate be substantially free from sulphuric acid. Any excess hydrochloric acid dissolved in the solvent is removed simultaneously with the evaporation of the solvent.

We have found that sometimes, though there is a color change from orange to red in the solution, indicating the commencement of the reaction, the hydrochloric acid gas will not procure a satisfactory precipitation of the salt. This, however, can be easily remedied by introducing a small amount of moisture into the solution. As a rule the extraneous addition of water is not necessary, since either the introduced hydrochloric acid gas or the solution carries sufficent moisture to satisfactorily complete the reaction. In order to obtain best results, we have found it of advantage to maintain a moisture content of approximately 1% within the solution.

Though the free acids obtained in this manner are substantially pure, some of the salt produced during the reaction is still sufficiently dissociated as the result of the moisture content and will escape filtration. So, for instance, a moisture content of approximately 1% will give on analysis an ash residue of about 0.17%, indicating that some salt was retained by the mahogany sulphonic acid. We have discovered that we can eliminate the last traces of any such salt, obtaining upon analysis a product absolutely free from any ash residue, by adding a slight percentage of a suitable aliphatic alcohol such as methyl, ethyl, propyl, butyl or similar alcohol but preferably about 1% of ethyl alcohol to the solution of the mahogany sulphonate.

In the practical application of our method we preferably employ a 25% solution of acid-free mahogany sulphonate, containing approximately 5% water in a suitable solvent such as gasoline or petrol ether. The hydrochloric acid gas is preferably passed in a dry state through this solution. In this manner the moisture content can be more easily regulated and limited to the amount just sufficient to effectuate the substantially complete precipitation of the salt. The presence of excessive amounts of water should be avoided as these cause a partial redissolution of the precipitated salts, thereby increasing the amount of salt retained by the free acid after the evaporation of the solvent. Due to the rather unstable character of the mahogany sulphonic acids at higher temperatures, it is of advantage to conduct the evaporation of the solvent by vacuum distillation.

The foregoing description is by way of illustration and not of limitation, and we are not to be limited to any details but only by the appended claims in which we have endeavored to claim broadly all inherent novelty.

We claim:

1. Method of preparing pure free mahogany sulphonic acids which comprises passing gaseous hydrochloric acid through a solution of mahogany sulphonates, substantially free from involatile inorganic acids, in a substantially water immiscible organic solvent thereby forming a solution of free mahogany sulphonic acids and undissolved inorganic salts thereafter separating said inorganic salts from said solution and finally removing the solvent from the solution of the free mahogany sulphonic acids, said solvent being substantially incapable of dissolving inorganic salts, and said gaseous hydrochloric acid being passed through said solution of mahogany sulphonates in amount sufficient to convert substantially all of said mahogany sulphonates into free mahogany sulphonic acids.

2. Method of preparing pure free mahogany sulphonic acids which comprises passing gaseous hydrochloric acid through a solution of mahogany sulphonates, substantially free from involatile inorganic acids, in a substantially water immiscible organic solvent thereby forming a solution of free mahogany sulphonic acids and undissolved inorganic salts while substantially maintaining in said solvent a moisture content sufficient to substantially complete the reaction between said hydrochloric acid and said mahogany sulphonates, thereafter separating said inorganic salts from said solution and finally removing the solvent from the solution of the free mahogany sulphonic acids, said solvent being substantially incapable of dissolving inorganic salts, and said gaseous hydrochloric acid being passed through said solution of mahogany sulphonates in amount sufficient to convert substantially all of said mahogany sulphonates into free mahogany sulphonic acids.

3. Method of preparing pure free mahogany sulphonic acids which comprises passing gaseous hydrochloric acid through a solution of mahogany sulphonates, substantially free from involatile inorganic acids, in a substantially water immiscible organic solvent thereby forming a solution of free mahogany sulphonic acids and undissolved inorganic salts while substantially maintaining in said solvent a moisture content of 1%, thereafter separating said inorganic salts from said solution and finally removing the solvent from the solution of the free mahogany sulphonic acids, said solvent being substantially incapable of dissolving inorganic salts, and said gaseous hydrochloric acid being passed through said solution of mahogany sulphonates in amount sufficient to convert substantially all of said mahogany sulphonates into free mahogany sulphonic acids.

4. Method of preparing pure free mahogany sulphonic acids which comprises passing gaseous hydrochloric acid through a solution of mahogany sulphonates, substantially free from involatile inorganic acids, in a substantially water immiscible organic solvent containing an aliphatic alcohol, thereby forming a solution of free mahogany sulphonic acids and undissolved inorganic salts while substantially maintaining in said solvent a moisture content sufficient to substantially complete the reaction between said hydrochloric acid and said mahogany sulphonates, thereafter separating said inorganic salts from said solution and finally removing the solvent from the solution of the free mahogany sulphonic acids, said solvent being substantially incapable of dissolving inorganic salts, said aliphatic alcohol being present in amount sufficient to effectuate a substantially complete precipitation of inorganic salts formed in said solution, said gaseous hydrochloric acid being passed through said solution of mahogany sulphonates in amount sufficient to convert substantially all of said mahogany sulphonates into free mahogany sulphonic acids.

5. Method of preparing pure free mahogany sulphonic acids which comprises passing gaseous hydrochloric acid through a solution of mahogany sulphonates, substantially free from involatile inorganic acids, in a substantially water immiscible organic solvent and containing substantially 1% of ethyl alcohol thereby forming a solution of free mahogany sulphonic acids and undissolved inorganic salts while substantially maintaining in said solvent a moisture content sufficient to substantially complete the reaction between said hydrochloric acid and said mahogany sulphonates, thereafter separating said inorganic salts from said solution and finally removing the solvent from the solution of the free mahogany sulphonic acids, said solvent being substantially incapable of dissolving inorganic salts, and said gaseous hydrochloric acid being passed through said solution of mahogany sulphonates in amount sufficient to convert substantially all of said mahogany sulphonates into free mahogany sulphonic acids.

6. Method of preparing pure free mahogany sulphonic acids which comprises passing gaseous hydrochloric acid through a solution of mahogany sulphonates, substantially free from involatile inorganic acids, in a substantially water immiscible organic solvent and containing substantially 1% of ethyl alcohol thereby forming a solution of free mahogany sulphonic acids and undissolved inorganic salts, while substantially maintaining in said solvent a moisture content of 1% thereafter separating said inorganic salts from said solution and finally removing the solvent from the solution of the free mahogany sulphonic acids, said solvent being substantially incapable of dissolving inorganic salts, and said gaseous hydrochloric acid being passed through said solution of mahogany sulphonates in amount sufficient to convert substantially all of said mahogany sulphonates into free mahogany sulphonic acids.

GEORGE ANDREAS KESSLER.
LEO SALZMANN.